United States Patent
Schmitt

(12) 
(10) Patent No.: US 10,029,196 B2
(45) Date of Patent: Jul. 24, 2018

(54) FILTER ASSEMBLY WITH MANIFOLD FOR MULTIPLE FILTER ELEMENT HOUSINGS AND FILTER ELEMENT HOUSING COUPLING THEREFORE

(71) Applicant: Schroeder Industries, LLC, Leetsdale, PA (US)

(72) Inventor: Michael J Schmitt, Pittsburgh, PA (US)

(73) Assignee: SCHROEDER INDUSTRIES, LLC, Leetsdale, PA (US)

( * ) Notice: Subject to any disclaimer, the term of this patent is extended or adjusted under 35 U.S.C. 154(b) by 309 days.

(21) Appl. No.: 14/208,036

(22) Filed: Mar. 13, 2014

(65) Prior Publication Data

US 2014/0263027 A1 Sep. 18, 2014

Related U.S. Application Data

(60) Provisional application No. 61/781,799, filed on Mar. 14, 2013.

(51) Int. Cl.
*B01D 35/30* (2006.01)

(52) U.S. Cl.
CPC .................. *B01D 35/303* (2013.01)

(58) Field of Classification Search
None
See application file for complete search history.

(56) References Cited

U.S. PATENT DOCUMENTS

| | | | | |
|---|---|---|---|---|
| 2,071,483 | A * | 2/1937 | Winslow | B01D 35/12 210/133 |
| 2,757,803 | A * | 8/1956 | Robinson | B01D 17/045 210/316 |
| 4,476,015 | A * | 10/1984 | Schmitt | B01D 61/022 210/321.83 |
| 4,588,503 | A * | 5/1986 | Sugiura | B01D 29/073 210/232 |
| 5,139,663 | A * | 8/1992 | Maples | B01D 17/0205 137/592 |
| 5,888,384 | A * | 3/1999 | Wiederhold | B01D 29/21 210/130 |
| 2010/0032361 | A1* | 2/2010 | Evanovich | B01D 35/303 210/232 |

* cited by examiner

*Primary Examiner* — Benjamin M Kurtz

(74) *Attorney, Agent, or Firm* — Blynn L. Shideler; Krisanne Shideler; BLK Law Group

(57) ABSTRACT

A filter assembly includes multiple filter element housings with each filter housing receiving a filter element therein; a manifold supporting the multiple filter element housings; and a filter element housing coupling to attach each filter element housing to the manifold, each filter element housing coupling including a filter housing retainer ring bolted to the manifold to couple the filter housing to the manifold.

11 Claims, 2 Drawing Sheets

SECTION VIEW

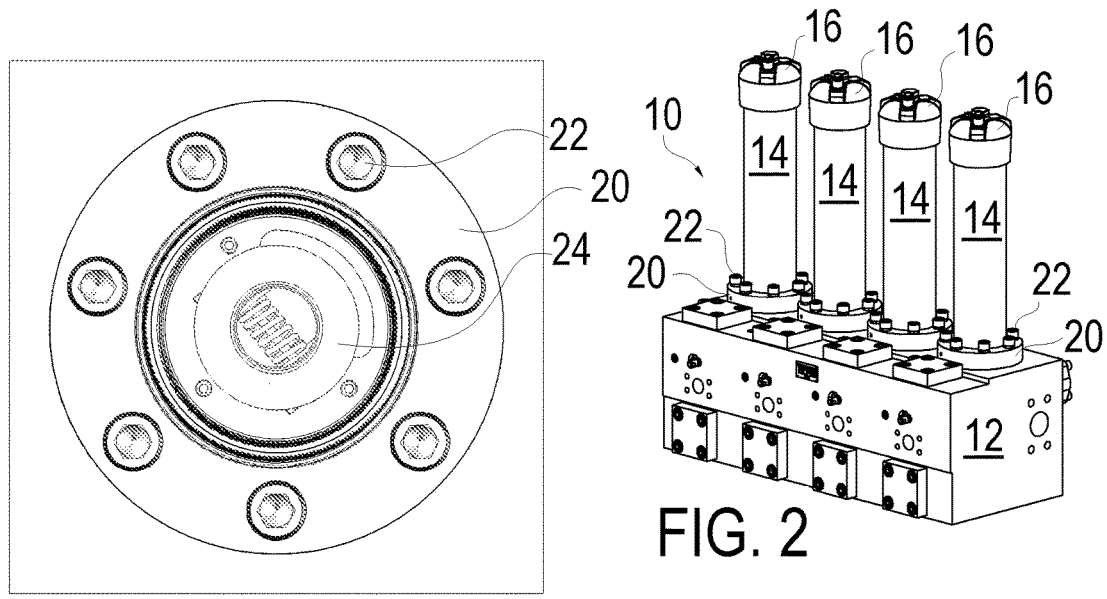
FIG. 3
FIG. 2
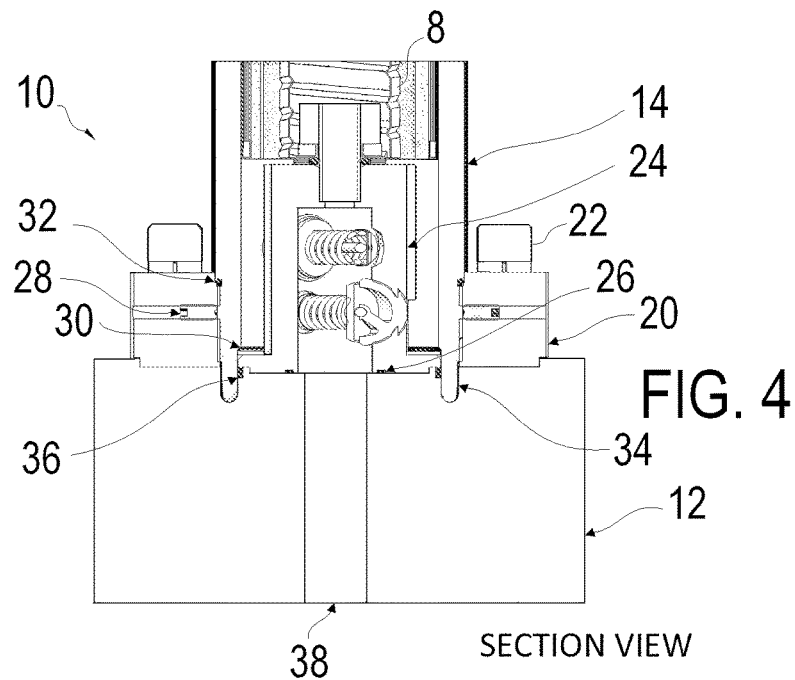
FIG. 4
SECTION VIEW

FILTER ASSEMBLY WITH MANIFOLD FOR MULTIPLE FILTER ELEMENT HOUSINGS AND FILTER ELEMENT HOUSING COUPLING THEREFORE

RELATED APPLICATIONS

This application claims priority to U.S. patent application Ser. No. 61/781,799 filed Mar. 14, 2013, entitled "Filter Assembly with Manifold for Multiple Filter Element Housings and Filter Element Housing Coupling Therefore" which application is incorporated herein by reference in its entirety.

BACKGROUND INFORMATION

1. Field of the Invention

The present invention relates to filter assemblies, and more particular to a filter assembly with manifold for multiple filter element housings and filter element housing coupling therefore.

2. Background Information

Filtration systems, traditionally considered a fluid treatment, can also be considered as a part of contamination management, which can be defines as relating to the analysis and optimization of processes with regard to the cleanliness of components, systems and the purity of the fluids used. In today's hydraulic systems, the hydraulics and mobile hydraulics industry, smaller, lighter and more powerful components are currently being used compared to only a decade ago. The use of these components also means that the demand of system cleanliness is now much higher, as has been shown by various studies. As much as 90% of all hydraulic system outages are due to increased contamination. This failure rate applies to more than classic hydraulics industry.

Contamination management, such as through the design and implementation of appropriate filter assemblies, is also a key issue in the automotive industry, in which the use of electrohydraulic systems is on the rise. In this context, hydraulic or fluid power systems are used in a general sense for all industries. In the past, fluid power systems were equipped with system filtration units, which cleaned the system during commissioning and then had the task of maintaining system fluid cleanliness at a constant level, e.g. by using commissioning filter assemblies and initial brief maintenance intervals followed by changing over to system filtration. This approach frequently no longer suffices due to the growing demands made of today's hydraulic systems (extended maintenance intervals and mounting cost pressure).

Pre-commissioning flushing is performed in large systems in the hydraulics industry to quickly bring the contamination down to an acceptable level.

In fluid treatment applications, filtration units include i) disposable units in which the filtration media and housing are integrated into a single use unit, often called "spin-ons" due to common threaded attachment technique; ii) replaceable units in which the filtration media is formed in an element or cartridge that can be removed from a unit housing forming a filter assembly; and iii) filtration units with cleanable media, such as by back-flushing.

Thus a filter element, also called a filter cartridge, within the meaning of this application, is a unit including filter media that is configured to be received in a filter assembly housing. The filter assembly is one or more filter housings and associated filter elements together with other elements of the unit such as a control, test points, particle counters, bypass valves, etc.

It is known to form a filter assembly with several filter elements coupled together in series such as for staged particulate filtration. A representative example of this has been sold by the applicant under the mark FILTRATION STATION® and which assembly is capable of flushing, filtering, and monitoring ISO cleanliness with user-defined, automatic features. The assembly is designed to transfer fluid through two filter elements in series for staged particulate or water/particulate removal. See also the MKF50™ brand Base-ported high pressure dual filter manifold mounted assembly from the applicant.

Where several filter element housings are incorporated into a filter assembly the filter element housings may be designed for manifold mounting and often feature both the inlet and outlet ports on a common surface. This type of mounting eliminates the need for connection hose and fittings and is beneficial when available space is minimal. Manifold mounting also reduces pressure drop and the potential for leakage. The manifold supports each filter element housing and includes the couplings to connect the associated filter elements in series or parallel or combination thereof as designed.

In a multi-filter element housing configuration using a manifold, the manifold is often one of the most expensive pieces of the system and time consuming to manufacture. The cost of replacing the manifold is quite expensive when elements become worn.

There is a need for a cost effective, efficient, filter assembly with manifold for multiple filter element housings and filter element housing coupling therefore.

SUMMARY OF THE INVENTION

This invention is directed to a cost effective, efficient, filter assembly with manifold for multiple filter element housings and filter element housing coupling therefore. The invention provides a filter assembly which includes multiple filter element housings with each filter housing receiving a filter element therein; a manifold supporting the multiple filter element housings; and a filter element housing coupling to attach each filter element housing to the manifold, each filter element housing coupling including a filter housing retainer ring bolted to the manifold to couple the filter housing to the manifold.

BRIEF DESCRIPTION OF THE DRAWINGS

FIG. 2 is a perspective view of the filter assembly with manifold for multiple filter element housings according to FIG. 1;

FIG. 3 is a top plan view of a filter element housing coupling on the manifold of the filter assembly of FIG. 1 with the filter element housing removed for clarity; and FIG. 4 is schematic section view of filter element housing coupling and filter element housing on the manifold of the filter assembly of FIG. 1.

BRIEF DESCRIPTION OF THE PREFERRED EMBODIMENTS

Figure 1:
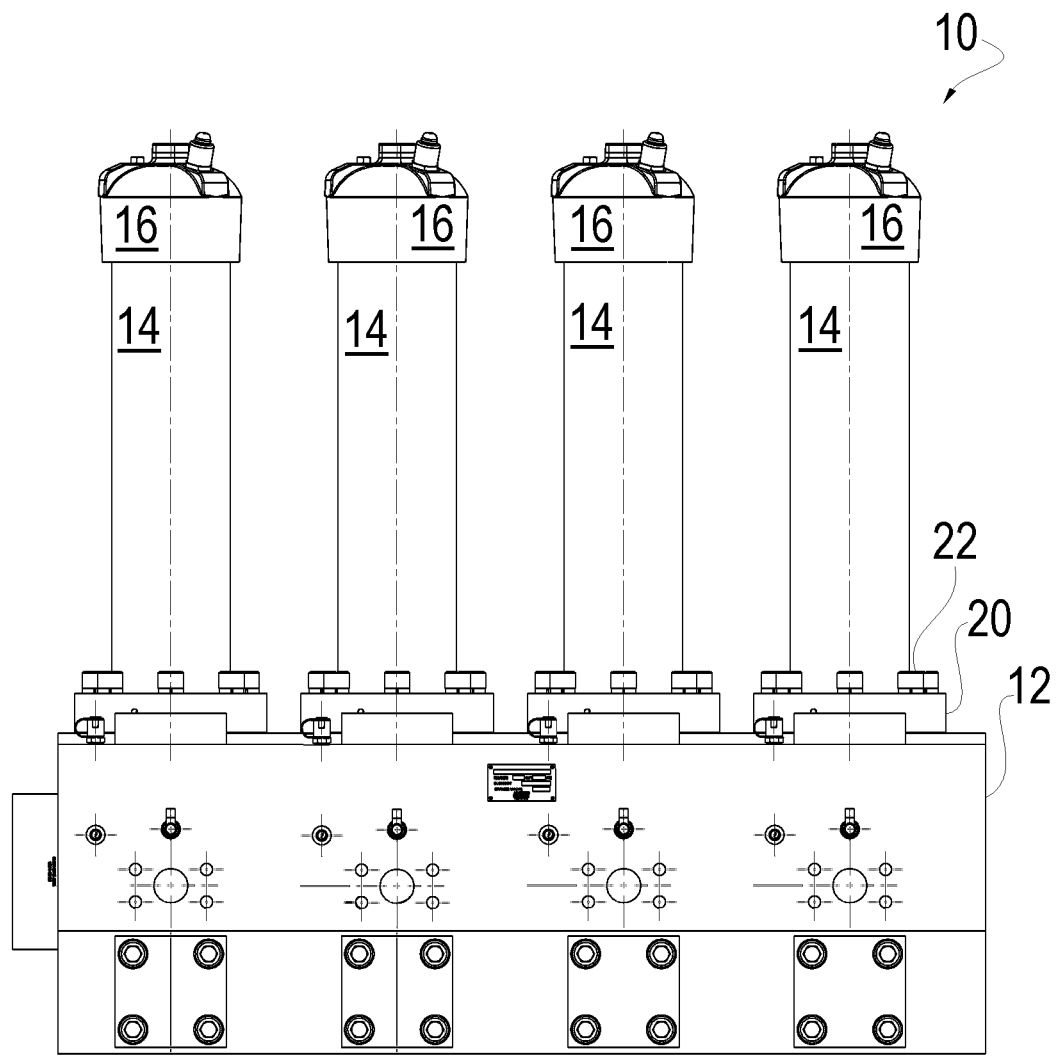
FIG. 1 is a side elevation view of a filter assembly with manifold for multiple filter element housings according to one embodiment of the present invention.

This invention is directed to a cost effective, efficient, filter assembly 10 with manifold 12 for multiple filter element housings 14, one embodiment of which is shown in FIGS. 1-2. This filter assembly 10 as shown uses four filter housings 14 each holding a filter element 8 or cartridge therein (shown in part in FIG. 4) and capped with an end cap 16 that may include a visual indicator. Suitable filter elements 8 or cartridges are available from the applicant Schroeder Industries, LLC. The assembly 10 can have a rated capacity of 120 gallons per minute per filter with an operating pressure of up to 6,000 psi in the embodiment shown.

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The filter assembly 10 has the cylindrical filter element housings 14 designed for mounting on the manifold 12 with both the inlet and outlet ports on a common surface. This type of mounting eliminates the need for connection hose and fittings and is beneficial when available space is minimal. Manifold mounting also reduces pressure drop and the potential for leakage.

The manifold 12 supports each filter element housing 14 and includes the internal passages to connect the associated filter elements in series or parallel or combination thereof as designed. The manifold 12 can be easily formed from steel and will include test points and other access as known in the art.

The key feature of the present invention is the provision of a filter element housing coupling which includes a filter housing retainer ring 20 bolted to the manifold 12 with an array of bolts 22. The retainer ring 20 is separate from the manifold 12 and is used to couple the filter housing 14 to the manifold.

The assembly 10 can include a bypass valve assembly 24 for bypass operation of the filter element 8 generally an outside-in flow where fluid enters the element 8 through the perimeter of the element 8 and flows through each layer before it exits through the center of the element 8 to the manifold exit 38. An annular seal 26 seals against the manifold and the assembly 24.

The filter element 8 may also be inside-out flow design where fluid enters the element 8 through the inner core and flows through each layer before it exits around the perimeter of the element 8. The element 8 may be for removing particulate contaminants; or for liquid-liquid separation of a dispersed phase, water, and a continuous phase, hydrocarbon oil or fuel oil; or other known element design.

An annular array of set screws 28 are in the retainer ring 20 and secured to the filter housing 14 to prevent the threaded housing 14 from vibrating loose in use. Additional securing techniques can be used such as forming a groove for receipt of the set screws 28 or a flange on the filter housing 14 received within a notch on the retainer ring 20 (or vice versa), however these increase expense and is not believed to be required for conventional operation. The manifold 12 includes an annular groove 34 for receipt of the filter housing 14.

An annular seal 30 is positioned to seal around the inner perimeter of the filter housing 14 and the manifold and faces operating pressure in the inside out flow design. A back-up sealing member 36 for the system is shown and the backup seal 36 does not facing operating pressure. An additional annular weather seal 32 is positioned between the filter housing 14 and the retainer ring 20, and O-ring 32 protects the threaded section from dirt and debris.

The housing 14 may be threaded to the groove 34 or to the retainer ring 20 for attachment.

The filter element housing coupling described above allows for rapid manufacture of the manifold 12 and the associated assembly 10. Further the assembly 10 allows for individual components to be replaced if failure occurs without scrapping or severely damaging the manifold. Further the seal on the inside of the housing allows for survival of high pressure fatigue applications.

The preferred embodiments described above are illustrative of the present invention and not restrictive hereof. It will be obvious that various changes may be made to the present invention without departing from the spirit and scope of the invention. The precise scope of the present invention is defined by the appended claims and equivalents thereto.

What is claimed is:

1. A filter assembly comprising: multiple cylindrical filter element housings, each filter housing receiving a filter element therein; a manifold supporting the multiple filter element housings, wherein the manifold includes a plurality of annular grooves with one annular groove receiving one cylindrical filter element housing therein; at least one seal for each filter element housing positioned radially within an inner edge of the annular groove and configured to seal around an inner perimeter of its respective cylindrical filter element housing; a filter element housing coupling to attach each cylindrical filter element housing to the manifold, each filter element housing coupling including a filter housing retainer ring surrounding its respective cylindrical filter element housing and bolted to the manifold to couple its respective cylindrical filter element housing to the manifold; and a bypass valve assembly for bypass operation of the filter element of each filter element housing, wherein the at least one seal includes at least one annular seal between the manifold and the bypass valve assembly.

2. The filter assembly according to claim 1 wherein the bolts of each filter element housing coupling is formed as an annular array of bolts.

3. The filter assembly according to claim 1 wherein each filter element is configured for an outside-in flow.

4. The filter assembly according to claim 1 including at least one set screw in each the retainer ring and secured to the respective cylindrical filter element housing.

5. The filter assembly according to claim 4 wherein an annular array of set screws is in each retainer ring.

6. The filter assembly according to claim 3 wherein the bolts of each filter element housing coupling is formed as an annular array of bolts.

7. The filter assembly according to claim 3 including at least one set screw in each retainer ring and secured to the respective cylindrical filter element housing.

8. The filter assembly according to claim 3 wherein an annular array of set screws is in each retainer ring.

9. A filter assembly comprising: multiple filter element housings, each filter element housing receiving a filter element therein and wherein each filter element is configured for an outside-in flow; a manifold supporting the multiple filter element housings, wherein each filter element housing is a cylindrical filter element housing, wherein the manifold includes a plurality of annular grooves with one annular groove receiving one respective cylindrical filter element housing therein; at least one seal for each filter element housing positioned radially within an inner edge of the annular groove receiving the respective cylindrical filter element housing and configured to seal around an inner perimeter of the respective cylindrical filter element housing; a filter element housing coupling to attach each filter element housing to the manifold, each filter element housing coupling including an annular filter housing retainer surrounding its respective cylindrical filter element housing and ring bolted with an array of bolts to the manifold to couple the respective cylindrical filter element housing to the manifold; and a bypass valve assembly for bypass operation of the filter element of each filter element housing, wherein the at least one seal includes at least one annular seal between the manifold and the bypass valve assembly.

10. The filter assembly according to claim 9 wherein the at least one seal includes at least one annular seal positioned to seal around the inner perimeter of its respective cylindrical filter element housing.

11. The filter assembly according to claim 9 including an array of set screws in each annular filter housing retainer the retainer ring and secured to the filter housing.

* * * * *